Oct. 7, 1969 G. M. FERRIEU 3,471,797

FREQUENCY SELECTIVE FILTERS USING PASSIVE IMPEDANCES AND TWO-TERMINAL ACTIVE NETWORKS

Filed Feb. 18, 1965 5 Sheets-Sheet 2

United States Patent Office 3,471,797
Patented Oct. 7, 1969

3,471,797

FREQUENCY SELECTIVE FILTERS USING PASSIVE IMPEDANCES AND TWO-TERMINAL ACTIVE NETWORKS

Gilbert Marcel Ferrieu, Route du Port, Locquemeau par Tredrez, Cotes-du-Nord, France
Filed Feb. 18, 1965, Ser. No. 433,756
Claims priority, application France, Apr. 8, 1964, 970,166
Int. Cl. H03f *21/00, 3/04*
U.S. Cl. 330—207 1 Claim

ABSTRACT OF THE DISCLOSURE

A two-terminal active network consisting of the combination of a high gain amplifier with a four-terminal passive network, in which the inputs of said amplifier and passive network are series-connected, in which the outputs of said amplifier and passive network are series-connected, and in which the non-series connected to said passive network terminals of said amplifier are interconnected by a first direct connection, while the non-series connected to said amplifier terminals of said passive network are interconnected by a second direct connection. Said first and second direct connections constitute the terminals of said active network, the impedance of which is equal to the transfer impedance of said passive network. Filters may be built by combining said active network with at least one passive network.

The present invention relates to two-terminal active electrical networks having frequency selective properties, i.e. the impedance of which, taken between their terminals, depends on frequency in a predetermined manner.

The invention also relates to four-terminal filter networks incorporating at least one two-terminal active network according to the invention, in combination with one or several passive and/or active impedances.

By "active network" shall be understood the combination of an electrical network consisting of such passive elements as resistances, capacitances and inductances, with an amplifier.

Various types of active networks, more particularly four-terminal active networks, are known. Their properties essentially depend on the constitution of the passive network which they include and on the interconnection method of the latter with the amplifier.

So-called active filters incorporating an amplifier have already been proposed, in particular as active low-pass filters with a very low cut-off frequency. Such filters have been described in the following publications for example:

"An active R-C filter using cathode-followers," by P. J. W. McVey, in the British review "Electronic Engineering," vol. 34, July 1962, pp. 458–463;

"A Note on Active R-C Low-Pass Filters," by K. W. Chong and R. S. C. Cobbold, in the same review "Electronic Engineering," vol. 35, July 1963, pp. 458–460;

"Active Low-Pass R-C Filters," by D. P. Franklin, in the British review "Electronic Technology," August 1961, vol. 38, No. 8, pp. 278–282.

In these active filters, a passive network and amplifier are cascade-connected and a feedback circuit, which may itself comprise a passive network, is provided in most cases. The cascade-connection of the passive and active networks has several consequences:

(a) the resulting network is a four-terminal, not a two-terminal network;

(b) all components of the input signal contained in the passing band pass through the amplifier;

(c) the load being connected to the output terminals of the amplifier, the direct power supply current of the latter passes through it in the absence of the input signal, at least in the cases of the low-pass filters where the load cannot be separated from the power supply source by means of capacitors.

In contrast hereto, in the filters according to the invention, thanks to the connection method of the passive and active networks and owing to the fact that the resulting network is equivalent to a two-terminal network, only those components of the input signal which it is desired to attenuate flow through the amplifier, and the load is not traversed by the power supply current of the amplifier.

The main object of the invention is an interconnection method between an amplifier and a four-terminal network, by means of which a two-terminal network is constituted and according to which the said two-terminal network may be given more general frequency selective properties than those found in the active networks of the prior art. More precisely, the arrangements of the invention make it possible to give the said two-terminal network an impedance substantially equal to the transfer impedance of a passive four-terminal network.

Now, it is known that the transfer impedance of a four-terminal network is endowed with more general frequency-dependence properties than those of its driving-point impedances. For instance, in the case of networks operated at very low frequencies, in which the use of inductances is unpractical by reason of the very high required inductance values, it is generally advisable to make use of resistances and capacitances only. It is well known that such networks cannot have a zero impedance at a given frequency and a non-zero impedance at other frequencies while, on the contrary, it is possible to build them in such a way that their transfer impedance fulfills such conditions, as it is the case in those networks known as Wien's bridge, twin-T, etc.

The active two-terminal networks of the invention may be inserted in four-terminal networks, to form four-terminal frequency filters. A simple form of such filters is that which comprises an active two-terminal network according to the invention combined with a fixed resistance. This resistance may be the internal resistance of a signal source. If a signal source having a finite internal resistance is connected across a two-terminal network according to the invention, the ratio of the voltage developed across the said network to the electromotive force of the source is a function of frequency. It may thus be said that the two-terminal network, in combination with the internal resistance of the source, with which it forms a four-terminal network, only two terminals of which physically exist, behaves like a frequency filter.

Another object of the invention is, as already mentioned, the building of active filters in which only those components of the input signal which have to be attenuated pass through the amplifier and, in particular, of low-pass active filters capable of filtering signals having a direct-current component, in which the latter component will not flow through the amplifier.

Another object of the invention is the building of active filters mainly consisting of resistances and capacitors, called active "RC-filters" and having cut-off frequencies of the order of magnitude of a few cycles per second or a few tens of cycles per second.

Still another object of the invention is to create active filters, more especially low-pass filters, in which the amplifier current does not pass through the load, contrarily to what is the case in the known active low-pass filters comprising a passive network and an amplifier connected in cascade and a load connected to the output of the amplifier. The result hereof is that in the case where the input signal contains a direct-current component, the latter is not mixed, after filtering, with the supply (or bias) current of the amplifier.

To make it possible to build an active network equivalent to a two-terminal network according to the invention, the passive network it contains must comprise a direct connection between one of its input terminals and one of its output terminals and, similarly, the amplifier must comprise a direct connection linking one of its input terminals to one of its output terminals. The two terminals of the passive network thus linked by an equipotential connection and which consequently constitute a single terminal, and the two terminals of the amplifier likewise linked by an equipotential connection and thus also constituting a single terminal, are taken as the terminals of the active two-terminal network, while the passive network and the amplifier are series-connected on one hand, by their remaining input terminals and on the other hand, by their remaining output terminals.

According to the invention, there is provided an active two-terminal electrical network comprising a passive four-terminal network having a common input and output terminal, a non-common input terminal and a non-common output terminal, and a high gain phase-inverting amplifier having a common input and output terminal, a non-common input terminal and a non-common output terminal, wherein the said non-common input terminals of the said passive network and amplifier are connected through a first direct connection, wherein the said non-common output terminals of the said passive network and amplifier are connected through a second direct connection, and wherein the terminals of said active two-terminal network are constituted by one and the other of the said common terminals of the said passive network and amplifier, whereby the impedance of the said two-terminal network is made substantially equal to the transfer impedance of the said passive network.

Other objects, features and advantages of the active filters according to the invention will be better understood from the detailed description hereinafter given with reference to the accompanying drawings, in which.

Figure 1:
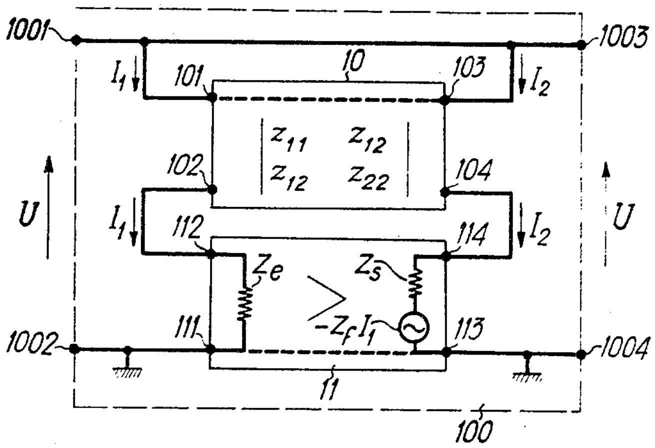
FIGURE 1 illustrates in block diagram form an active two-terminal network according to the invention.
Figure 2:
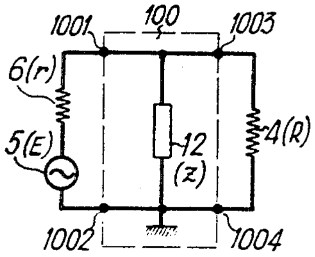
FIGURE 2 shows the diagram of a simple filter including a network having one pair of terminals, equivalent to that of FIGURE 1.

A network according to the invention is shown in FIG. 1. It essentially comprises a passive network 10 having two pairs of terminals 101–102 and 103–104 which is unbalanced, that is to saw it comprises a direct connection 101–103 linking one of its input terminals 101 and one of its output terminals 103, and a passive or amplifier network 11 having two pairs of terminals 111–112 and 113–114 which is likewise unbalanced, i.e. it comprises a direct connection 111–113 linking one of its input terminals 111 to one of its output terminals 113. The passive network 10 and the active network 11 are series-connected on both their input and output sides so as to form a total network 100, having a single terminal pair 1001–1002 (or 1003–1004) formed by the combination of terminals 102 and 112 on one hand and 104 and 114 on the other hand. As will be explained in detail later on, the gain of amplifier 11 must be very high. By reason of the conditions set forth above, imposed on the two networks 10 and 11, the connections 1001–1003 and 1002–1004 are equipotential; the result hereof is that the two-terminal network 100 is equivalent to an impedance 12 of value $z$, which in the circuit of FIG. 2 is shown in parallel connection in the circuit linking the signal source (5–6) to the load resistance 4.

It is known that when two networks having two pairs of terminals (FIG. 1) 10 and 11 are connected in series at both their input and output terminals, the impedance matrix of the total network 100 equals the sum of the impedance matrices of the constituting networks.

The impedance matrix of the passive network 10 is:

$$\begin{vmatrix} z_{11} & z_{12} \\ z_{12} & z_{22} \end{vmatrix}$$

the mutual impedance terms being equal, since the network is passive and reciprocal.

The impedance matrix of the active network 11 consequently is:

$$\begin{vmatrix} Z_e & O \\ -Z_f & Z_s \end{vmatrix}$$

wherein $Z_e$ is the input impedance, $Z_s$ the output impedance and $-Z_f$ the transfer impedance (which is negative, since the amplifier is a phase-inverting amplifier).

The impedance matrix of the total network 100 is:

$$\begin{vmatrix} z_{11}+Z_e & z_{12} \\ z_{12}-Z_f & z_{22}+Z_s \end{vmatrix}$$

Owing to the existence of direct connections between an input terminal and an output terminal of each of the networks 10 and 11, the input voltage of the total network is the same as its output voltage (their common value being denoted by U). The total network acts as an impedance 12 in parallel with the load 4 (FIG. 2). If $I_1$ and $I_2$ are respectively the values of the input and of the output current, both considered as entering the impedance 12, the current passing through this impedance 12 is $(I_1+I_2)$ and the value $z$ of this impedance is:

$$z=\frac{U}{I_1+I_2}=\frac{z_{12}Z_f+(z_{11}+Z_e)(z_{22}+Z_s)-z^2_{12}}{Z_f+z_{11}+z_{22}+Z_e+Z_s-2z_{12}} \quad (1)$$

This equation shows that if the transfer impedance $(-Z_f)$, which is in fact proportional to the gain of the amplifier, is very high, and if the input impedance $Z_e$ and the output impedance $Z_s$ of the amplifier are very low in relation to this transfer impedance, the impedance $z$ becomes equal to the term $z_{12}$ of the impedance matrix of the passive network.

To facilitate the understanding of the explanations hereinafter given, it will be recalled here what is understood by insertion loss and by transfer function relative to the insertion loss of a network having two pairs of terminals.

FIGURE 2 illustrates the impedance 12 of value $z$ equivalent to the total network 100 of FIG. 1. This network is fed at its "input" terminals 1001–1002 by a signal source 5 having an electromotive force E and an internal resistance 6 of value $r$, and the "output" terminals 1003–1004 of the network are connected to a load resistance 4 of value R. In fact, the source, load and impedance 12 are all in parallel connection.

If the impedance $z$ is infinite, the voltage $v$ at the terminals of the load resistance 4 is:

$$v=E/(1+r/R)$$

If the impedance $z$ is not infinite, the voltage $v'$ across the terminals of this same load resistance is:

$$v'=E/(1+r/R+r/z)$$

The transfer function (exp. a) relative to the insertion loss $a=\log_e(v/v')$ can be written:

$$\exp.\ a=1+rR/(r+R)\ z$$

and by substituting:

$$\rho=rR/(R+r)$$

$$\exp.\ a=1+\rho/z \quad (2)$$

Figure 3:
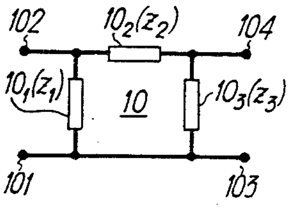
FIGURE 3 shows an example of a passive network incorporated into the active network of the invention.
Figure 4:
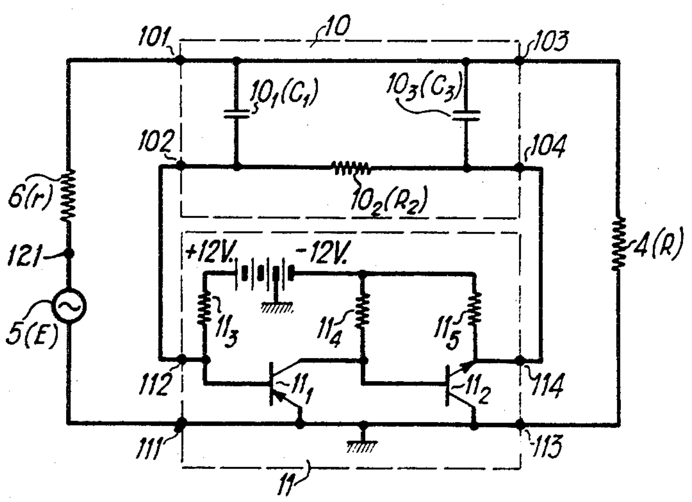
FIGURE 4 illustrates a first type of network according to the invention, adapted to a filter of the second-order Butterworth type.

First example.—Low-pass filter (FIGS. 3 and 4)

The passive network is a $\pi$-network 10, comprising a series element $\mathbf{10_2}$ of impedance $z_2$ and two shunt elements $\mathbf{10_1}$ and $\mathbf{10_3}$ having impedances $z_1$ and $z_3$ respectively. The impedance matrix of the network (FIG. 3) is:

$$H=\frac{1}{z_1+z_2+z_3}\begin{vmatrix} z_1(z_2+z_3) & z_1z_3 \\ z_1z_3 & z_3(z_1+z_2) \end{vmatrix} \quad (3)$$

and the transfer function is derived from Equation 2 by replacing $z$ therein by the value of the term in the upper right-hand position in the matrix of Equation 3, which gives:

$$\exp.\ a=1+\rho\left[\frac{1}{z_1}+\frac{1}{z_3}+\frac{z_2}{z_1z_3}\right] \quad (4)$$

Since a low-pass filter is concerned, the element $\mathbf{10_2}$ is a resistance of value $R_2$ and the elements $\mathbf{10_1}$ and $\mathbf{10_3}$ are capacitors having impedances $1/C_1p$ and $1/C_3p$ ($p$ being the product of the imaginary unit operator $j$ and the angular frequency of the signal applied to the network) as shown in FIG. 4. The Equation 4 can then be written:

$$\exp.\ a=1+\rho[(C_1+C_3)p+C_1R_2C_3p^2] \quad (5)$$

which is of the form $$\exp.\ a=1+a_1p+a_2p^2 \quad (6)$$

representing, as known, the transfer function of a low-pass filter. If a given type of low-pass filter is selected (Butterworth type, Chebyshev type, etc.) corresponding to predetermined values of the coefficients $a_1$ and $a_2$, the values of the elements constituting the filter according to the invention can be easily determined by equating the expressions (5) and (6).

However, for calculating simultaneously the literal values of the elements constituting all low-pass filters of a similar species, it is well known to replace the variable $p$ by a reduced variable $s=p/\Omega$, wherein $\Omega$ is an angular frequency having the same meaning for all filters of that species, denoting for example the angular frequency for which the loss due to the filter has the value 3 decibels. Equations 5 and 6 then become:

$$\exp.\ a=1+\rho[(C_1\Omega+C_3\Omega)s+(C_1\Omega)R_2(C_3\Omega)]s^2 \quad (5')$$

and:

$$\exp.\ a=1+a_1\Omega s+a_2\Omega^2s^2 \quad (6')$$

$$=1+A_1s+A_2s^2$$

the coefficients of $s$ and of $s^2$ in the Equations 5' and 6' then being dimensionless numerical coefficients.

By equating respectively the coefficients of Equations 5' and 6', there are obtained the relations:

$$A_1=\rho(C_1+C_3)\Omega \quad (7)$$

$$A_2=\rho C_1R_2C_3\Omega^2 \quad (8)$$

that is, two equations for determining three unknowns $C_1$, $R_2$ and $C_3$. It is therefore possible to impose an additional condition, for example:

$$C_1=C_3 \quad (9)$$

By way of an example, let it be assumed that it is desired to construct a low-pass filter of the so-called "maximally flat" Butterworth type, the well-known transfer function of which is given by the equation:

$$\exp.\ a=1+\sqrt{2}s+s^2 \quad (6'')$$

By resolving Equations 7, 8 and 9, in which $A_1=2$ and $A_2=1$, we obtain:

$$C_1=C_3=\frac{1}{\sqrt{2}\rho\Omega} \quad (10)$$

$$R_2=2\rho$$

which completely determines the passive network 10 of the low-pass filter.

By writing $$a=b+j\beta$$

wherein $b$ is the transfer loss and $\beta$ is a phase angle, it is possible to write by virtue of Equation 6'':

$$\exp.\ 2b=1+s^4=1+\left(\frac{\omega}{\Omega}\right)^4 \ (\omega=-jp)$$

wherefrom:

$$b=\frac{1}{2}\ \mathrm{Log}\left[1+\left(\frac{\omega}{\Omega}\right)^4\right]$$

which is the classical Butterworth equation.

Figure 5:
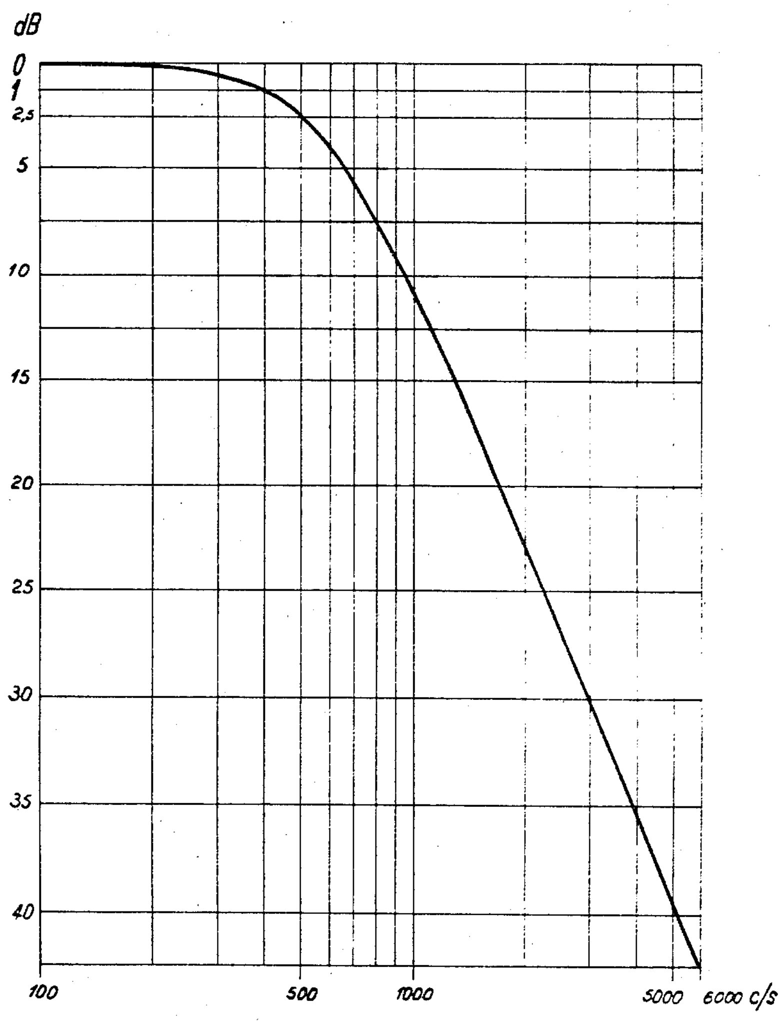
FIGURE 5 is an experimentally determined curve of the insertion loss of a low-pass filter including the network of FIG. 4.

FIGURE 5 shows an experimental curve of the insertion loss $b$ as a function of the frequency $f$. In this figure, the loss $b$ is evaluated in decibels following a linear scale plotted on the axis of ordinates and the frequency $f$ is evaluated in cycles per second, on a logarithmic scale plotted as abscissae.

The curve of FIG. 5 is that of a low-pass filter having a passband of 550 cycles per second with 3 decibels attenuation.

The value $r$ of the internal resistance 6 of the signal source 5 is of 2,700 ohms. The value R of the load resistance 4 is also of 2,700 ohms. The result hereof is that $$\rho=\frac{rR}{r+R}=1350\text{ ohms}$$

Since $\Omega=2\pi\times550$, the Formula 10 give:

$$C_1=C_3=0.15\text{ microfarad}$$

$$R_2={}^2\rho=2700\text{ ohms}$$

If as elements $\mathbf{10_1}$ and $\mathbf{10_3}$ there were employed capacitors having a capacitance of 15 microfarads, the low-pass filter obtained would have a 3 decibel passband of 5.5 cycles per second.

The amplifier 11 associated with the network 10 is a classical two stage transistor amplifier. The values of these constituting elements are as follows:

transistor $11_1$: type 2N 396 (commercial designation)
transistor $11_2$: type OC I40 (commercial designation)
resistance $11_3$: 5,600 ohms
resistance $11_4$: 22,000 ohms
resistance $11_5$: 1,000 ohms The electrical characteristics of the amplifier 11 are as follows:

input impedance: $Z_e=1{,}200$ ohms
output impedance: $Z_s=250$ ohms
transfer impedance: $Z_f=1{,}850$, $Z_s=460{,}000$ ohms Second example.—High-pass RC filter A high-pass filter according to the invention is constructed by replacing the passive network 10 of FIG. 4 by the passive network 20 of FIG. 6, the terminals 201–204 of FIG. 6 replacing the terminals 101–104 of FIG. 1.

The shunt elements $\mathbf{20_1}$ and $\mathbf{20_3}$ are two resistances having respectively the values $R_1$ and $R_3$ and the series element $\mathbf{20_2}$ is a capacitor of impedance $1/C_2p$. The transfer function relative to the insertion loss becomes in this case:

$$\text{exp. } a=1+\rho\left[\frac{1}{R_1}+\frac{1}{R_3}+\frac{1}{R_1C_2R_3p}\right]$$

which is of the form $$\text{exp. } a=1+a_0+\frac{a_1}{p}$$

and characterizes a high-pass filter. This high-pass filter displays a slight attenuation in its passband, due to the presence of the constant term $a_0=\rho/R_1+\rho/R_3$.

Third example.—High-pass R-L filter

Figure 7:
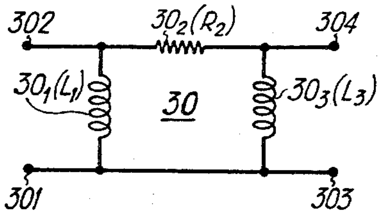

A high-pass filter according to the invention is obtained by replacing the passive network 10 of FIG. 4 by the passive network 30 of FIG. 7, the terminals 301–304 of FIG. 7 replacing the terminals 101–104 of FIG. 4. In the latter figure, the common point 121 to source 5 and resistor 6 constitutes the non-common input terminal of the filter.

The shunt elements $\mathbf{30_1}$ and $\mathbf{30_3}$ are two inductances of impedances $L_1p$ and $L_3p$ respectively and the series element $\mathbf{30_2}$ is a resistance of value $R_2$. The transfer function relative to the insertion loss becomes, in this case:

$$\text{exp. } a=1+\rho\left[\frac{1}{L_1p}+\frac{1}{L_3p}+\frac{1}{L_1R_2L_3p^2}\right]$$

which is of the form:

$$\text{exp. } a=1+\frac{a_1}{p}+\frac{a_2}{p^2}$$

and characterizes a high-pass filter.

Fourth example.—Bandpass filter with LC

Figure 8:
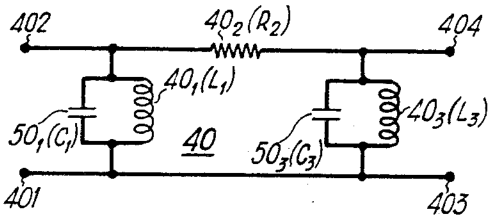

A bandpass filter according to the invention is constituted by replacing the passive network 10 of FIG. 4 by the passive network 40 of FIG. 8, the terminals 401–404 of FIG. 8 taking the place of the terminals 101–104 of FIG. 4.

The shunt elements are two resonant circuits, the first constituted by the inductance $\mathbf{40_1}$, of impedance $L_1p$, and the capacitor $\mathbf{50_1}$, of impedance $1/C_1p$, the second being composed of the inductance $\mathbf{40_3}$, of impedance $L_3p$, and the capacitor $\mathbf{50_3}$, having impedance $1/C_3p$; while the series element is a resistance $\mathbf{40_2}$ of value $R_2$. The values of the impedances of the elements are:

$$z_1=1/C_1\Omega\left(s+\frac{1}{s}\right)$$
$$z_2=R_2$$
$$z_3=1/C_3\Omega\left(s+\frac{1}{s}\right)$$

with $L_1C_1=L_3C_3$ and $\Omega=\sqrt{1/L_1C_1}$, and the transfer function relative to the insertion loss becomes in this case:

$$\text{exp. } a=1+\rho\left[(C_1+C_3)\Omega\left(s+\frac{1}{s}\right)+C_1R_2C_3\Omega^2\left(s+\frac{1}{s}\right)^2\right] \quad (11)$$

By identifying the function (11) of the reduced variable $$\left(s+\frac{1}{s}\right)$$

with the function (6) of the variable $p$ which defines a low-pass filter, it is possible to derive a bandpass filter according to the invention from a low-pass filter according to the invention.

Fifth example.—Low-pass filter with ladder network

Figure 9:
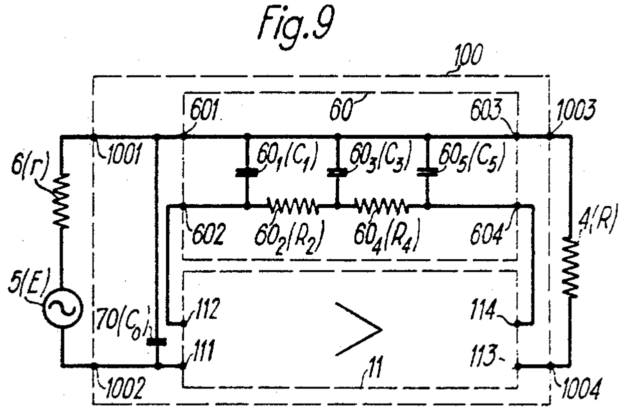
FIGURE 9 shows a second type of network according to the invention, for a third-order Butterworth type filter.

The low-pass filter of FIG. 9 differs from that of FIG. 4 in that the passive network 60 is a ladder network comprising three shunt elements $\mathbf{60_1}$, $\mathbf{60_3}$, $\mathbf{60_5}$, which are capacitors having impedances of respectively $1/C_1p$, $1/C_3p$, $1/C_5p$, and two series elements $\mathbf{60_2}$ and $\mathbf{60_4}$ which are resistances having the values $R_2$ and $R_4$, respectively. The terminals 601–604 of the passive network 60 replace the terminals 101–104 of the passive network 10. The amplifier 11 is the same as that used in FIG. 4. However, in contrast to FIG. 4, a capacitor 70 having impedance $1/C_0p$ is connected parallel to the terminals of the signal source 5–6.

The transfer function relative to the insertion loss is, in the present case:

$$\text{exp. } a=1+\rho[(C_0+C_2+C_3)p+C_1R_2(C_3+C_5)p^2 + (C_1+C_3)R_4C_5p^2+C_1R_2C_3R_4C_5p^3] \quad (12)$$

which is of the form:

$$\text{exp. } a=1+a_1p+{}_2p^2+a_3p^3 \quad (13)$$

If a low-pass filter with a third-order transfer function is required, then by identifying the coefficients $p$, $p^2$ and $p^3$ in Equations 12 and 13 there will be available three equations for determining the values of the six elements $C_0$, $C_1$, $R_2$, $C_3$, $R_4$ and $C_5$. The addition of the capacitor 70 thus makes it possible to impose three arbitrary conditions on the elements of the passive network 60, instead of two if this capacitor were not present. The three conditions will be chosen as $$C_1=C_2=C_3$$
$$R_2=R_4$$

By introducing the previously defined variable $s$, Equation 12 then becomes:

$$\text{exp. } a=1+p[(C_0+3C_1)\Omega s+4C^2_1R_2\Omega^2s^2 + C^3_1R_2^2\Omega^3s^3] \quad (12')$$

If as low-pass filter theer is chosen a third-order Butterworth filter, the transfer function of which is $$\text{exp. } a=1+2s+2s^2+2s^3 \quad (13')$$

the identification of the coefficients of the powers of $s$ in (12′) and (13′) yields:

$$C_1=C_2+C_3=1/4\rho\Omega$$
$$R_2=R_4=8\rho \quad (14)$$
$$C_0=5/4\rho\Omega$$

and, from Equation 13, the following value can be derived for the transfer loss:

$$b=\frac{1}{2}\text{Log}\left[1+\left(\frac{\omega}{\Omega}\right)^6\right]$$

Figure 10:
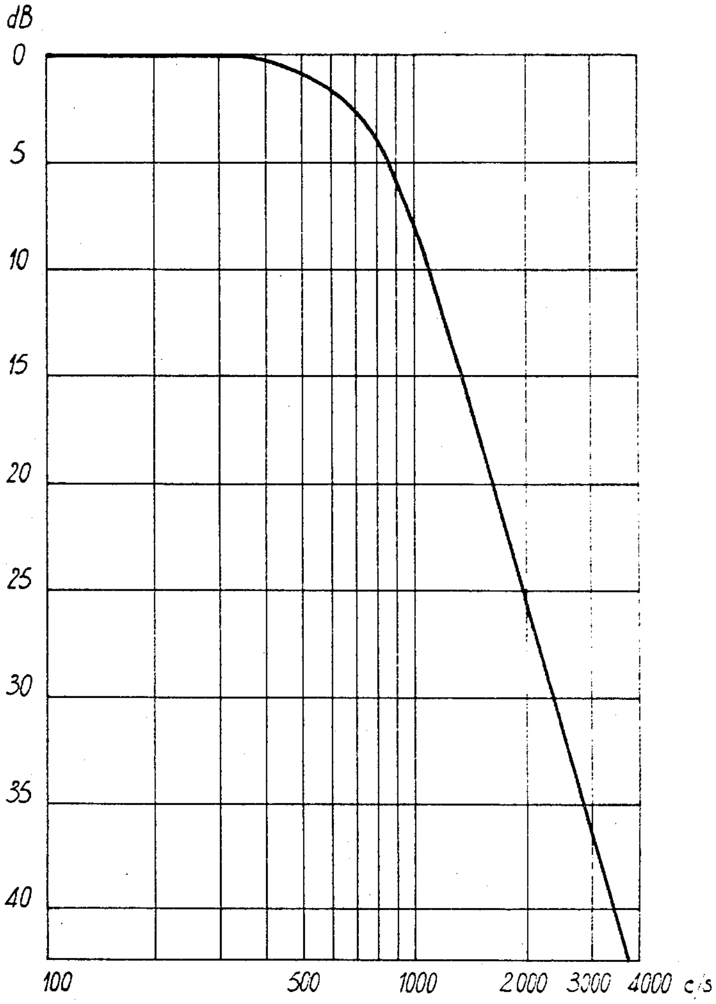
FIGURE 10 shows an experimentally determined curve of the insertion loss of the low-pass filter of FIG. 9.

FIGURE 10 shows an experimental curve of the insertion loss $b$ as a function of the frequency $f$. In this figure, the loss $b$ is evaluated in decibels on a linear scale plotted on the ordinate axis, while the frequency $f$ is evaluated on a logarithmic scale on the axis of abscissae.

The curve of FIG. 10 is that of a low-pass filter having a passband of 740 cycles per second with a 3-decibel loss.

Sixth example.—Bandpass filter with two passive networks

It is known, that the transfer function of a bandpass filter is of the form:

$$\text{exp. } a=1+a_1\left(s+\frac{1}{s}\right)+a_2\left(s+\frac{1}{s}\right)^2+\cdots$$

that is, by taking only the second-degree terms:

$$\text{exp. } a=1+a_1s+a_2s^2+2a_2+\frac{a_1}{s}+\frac{a_2}{s_2} \qquad (15)$$

The result of Equation 15 is that a bandpass filter according to the invention can be constituted by the cascade connection of two networks according to the invention, one of which, 100, is a low-pass one, while the other 100', is a high-pass one, the passive network in the first comprising shunt-connected capacitors and series-connected resistances, while the passive network in the second comprises shunt-connected resistances and series-connected capacitors.

Figure 11:
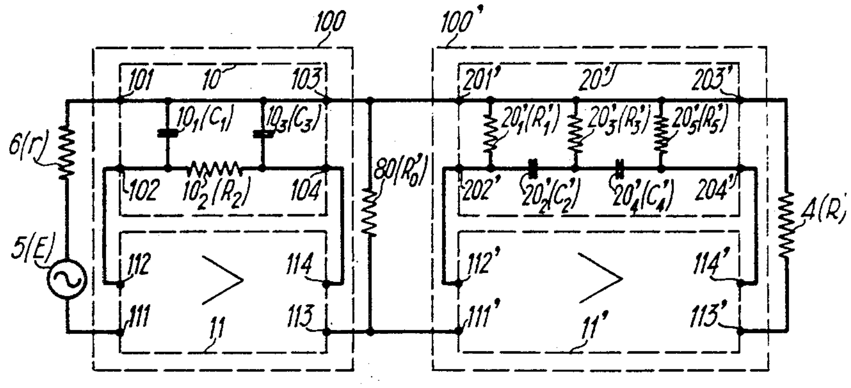
FIGURE 11 illustrates a bandpass filter of a second type according to the invention.

A network of this kind is shown in FIG. 11. In this figure, the low-pass filter comprises the passive network 10 identical with that of FIG. 4, i.e. comprising two shunt-connected capacitors $\mathbf{10_1}$ and $\mathbf{10_3}$ and a series-connected resistance $\mathbf{10_2}$, and the amplifier 11 also identical with that of FIG. 4.

Figure 6:
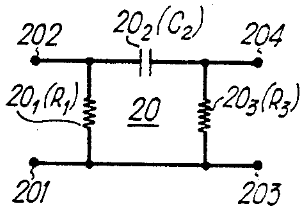
FIGURES 6, 7 and 8 illustrate, respectively, three other types of passive network, the first two of which can be included into a high-pass filter according to the invention, and the third of which can be included in a bandpass filter of a first type according to the invention.

The high-pass filter comprises the passive network 20' similar to the network 20 of FIG. 6 but differing from the latter in that it comprises three parallel-connected resistances $\mathbf{20'_1}$, $\mathbf{20'_3}$, $\mathbf{20'_5}$ having values of respectively $R'_1$, $R'_3$, $R'_5$ and two series-connected capacitors $\mathbf{20'_2}$, $\mathbf{20'_4}$ of impedances $1/C_2p$ and $1/C_4p$ respectively, and the amplifier 11' identical with the amplifier 11.

A resistance 80 of value $R'_0$ is connected across the line joining the two filters 100 and 100'.

The transfer function of the whole of the cascade-connected networks 100 and 100' is:

$$\text{exp. } a=1+\rho\Bigg[\left(\frac{1}{R'_0}+\frac{1}{R'_1}+\frac{1}{R'_3}+\frac{1}{R'_5}\right)+(C+C_3)\Omega s + C_1R_2C_3\Omega^2s^2 + \frac{1}{R'_1}\left(\frac{1}{R'_3}+\frac{1}{R'_5}\right)\frac{1}{C'_2\Omega s}+\frac{1}{R'_5}\left(\frac{1}{R'_1}+\frac{1}{R'_3}\right)\frac{1}{C'_4\Omega s} + \frac{1}{R'_1R'_3R'_5}\times\frac{1}{C'_2C'_4\Omega^2s^2}\Bigg] \qquad (16)$$

By identifying the Equations 15 and 16, there are obtained five equations for nine unknows $C_1$, $R_2$, $C_2$, $R'_1$, $C'_2$, $R'_3$, $C'_4$, $R'_5$ and $R'_0$. It is thus possible to impose four arbitrary conditions, for example the following four:

$$C_1=C_3$$
$$R'_1=R'_3=R'_5$$
$$C'_2=C'_4$$

Taking these conditions into account, Equation 16 can be written:

$$\text{exp. } a=1+\rho\Bigg[\left(\frac{1}{R'_0}+\frac{3}{R'_1}\right)+2C_1\Omega s+C_1^2R_2\Omega^2s^2 + \frac{1}{R'^2_1}\frac{1}{C'_2\Omega s}+\frac{1}{R'^3_1}\frac{1}{C'_2\Omega^2s^2}\Bigg] \qquad (16')$$

and, by identifying it with Equation 15:

$$C_1=C_3=\frac{1}{\rho\Omega}\frac{a_1}{2}$$
$$R_2=\frac{4a_2}{a_1^2}$$
$$R'_1=R'_2=R'_3=\rho\frac{16a_2}{a_1^2}$$
$$C'_2=C'_4=\frac{1}{\rho\Omega}\frac{a_1^3}{64a_2^2}$$
$$R'_0=\frac{16a_2}{32a_2^2-3a_1^2} \qquad (17)$$

If as bandpass filter there is chosen a second-order Butterworth pass-band filter, Equation 15 is written:

$$\text{exp. } a=1+\sqrt{2}\left(s+\frac{1}{s}\right)+\left(s+\frac{1}{s}\right)^2 \qquad (15')$$

and the Equation 17 become:

$$C_1=C_3=\frac{1}{\sqrt{2}\rho\Omega}$$
$$R_2=2\rho$$
$$R'_1=R'_3=R'_5=8\rho$$
$$C'_2=C'_4=\frac{1}{16\sqrt{2}\rho\Omega}$$
$$R'_0=\frac{8}{13}\rho \qquad (17')$$

To illustrate an important advantage of the devices of the invention, it will be remarked that by examining FIG. 9 for example, it is seen that the direct-current component of the input signal is applied to the load through the equipotential connections 1001–1003 and does not traverse, even partially, the amplifier.

Although the networks and filters according to the invention have been described in detail only in relation to certain specific structures of the selective passive network which they contain, it should be understood that any unbalanced four-terminal network in which a direct connection exists between one of the input terminals and one of the output terminals can be employed, the only condition imposed on the amplifier, in addition to a sufficient gain, being the provision of a direct connection between an input and an output terminal. Other filters may also be built by combining an active network according to the invention with one or several other active networks of the same or of another type, or with one or several passive and/or active impedances.

What is claimed is:

1. In a frequency filter having a non-common input terminal (121, FIG. 4), a non-common output terminal (103) and a common input and output terminal (111, 113), said filter consisting of a passive impedance (6) connected between said non-common input and output terminals (121, 103) and of a two-terminal active network (10, 11) connected between said non-common output terminal (103) and said common input and output terminal (111, 113), said active network consisting of the combination of a passive impedance network (10) with a high-gain phase inverting amplifier (11), said passive impedance network having a non-common input terminal (102), a non-common output terminal (104) and a common input and output terminal (101, 103) and said amplifier also having a non-common input terminal (112), a non-common output terminal (114) and a common input and output terminal (111, 113), the arrangement in which said non-common input terminals (102) and (112) of said network and amplifier are interconnected by a first direct connection, said non-common output terminals (104) and (114) of said network and amplifier are interconnected by a second direct connection, and in which said common input and output terminal (111, 113) of said amplifier constitutes said common input and output terminal of said filter, while said common input and output terminal (101, 103) of said network constitutes said non-common output terminal of said filter, whereby there is obtained between latter said terminals (103, 113) an impedance substantially equal to the transfer impedance of said passive network taken between its input terminals (101, 102) and its output terminals (103, 104).

References Cited

UNITED STATES PATENTS

| | | | |
|---|---|---|---|
| 1,725,154 | 8/1929 | Marsteller | 333—80 X |
| 3,051,920 | 8/1962 | Sandberg | 333—80 |
| 2,096,027 | 10/1937 | Bode | 330—105 X |
| 2,123,178 | 7/1938 | Bode | 330—105 X |
| 2,611,833 | 9/1952 | Roche | 330—188 X |

NATHAN KAUFMAN, Primary Examiner

U.S. Cl. X.R.

330—12